E197A XR 3,622,419

United States Patent

[11] 3,622,419

[72] Inventors Arnold Tempe London; Karel J. Brouwers, both of Scottsdale, Ariz.

[21] Appl. No. 864,785
[22] Filed Oct. 8, 1969
[45] Patented Nov. 23, 1971
[73] Assignee Motorola, Inc. Franklin Park, Ill.

[54] METHOD OF PACKAGING AN OPTOELECTRICAL DEVICE
4 Claims, 4 Drawing Figs.

[52] U.S. Cl. 156/242, 29/588, 156/99, 156/293, 156/303.1, 174/52 PE, 250/211 J, 250/227, 317/101 CP, 317/234 G, 264/255, 264/272, 338/19
[51] Int. Cl. H05k 5/06
[50] Field of Search 174/52.5, 52.6; 338/17, 19; 250/211, 211 J, 217, 227, 239; 313/108 P; 264/272; 317/101 A, 101 CP; 29/588; 156/99, 393, 303.1

[56] References Cited

UNITED STATES PATENTS

| | | | |
|---|---|---|---|
| 2,839,645 | 6/1958 | Hester | 338/19 X |
| 3,413,480 | 11/1968 | Biard et al. | 250/211 J |

*Primary Examiner*—Darrell L. Clay
*Attorney*—Mueller and Aichele

ABSTRACT: In packaging an optoelectrical device, liquid silicone which can be cured to become a transparent flexible polymer substance having an index of refraction close to that of a solid transparent cover plate is disposed between the light sensitive side of the device and a surface of the cover plate and in good optical coupling therewith.

Figure 1:
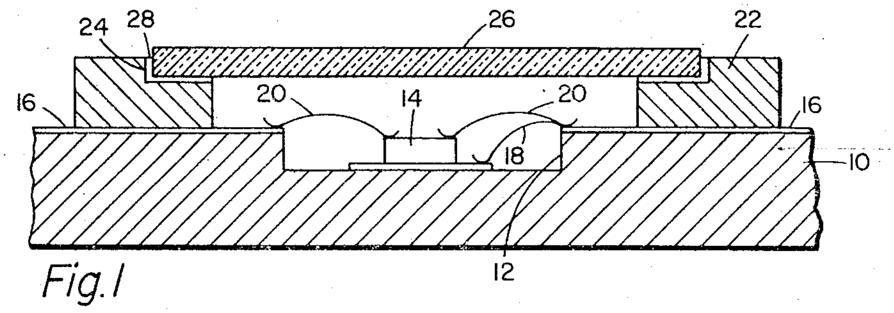

INVENTOR.
Arnold London
Karel J. Brouwers

BY Mueller, Aichele & Rauner

ATTY'S.

METHOD OF PACKAGING AN OPTOELECTRICAL DEVICE

BACKGROUND

When an optoelectrical device is packaged, it may be put behind a solid transparent cover plate, there being sufficient space between the light sensitive top of the device and the bottom of the cover plate to receive the bonding wires that are connected between the bonding pads on the device and the leads to the package. In such a package, light is lost by reflection at the outside and inside surfaces of the cover plate and at the surface of the device. Also, since the surface of the device is exposed to the air in the package, damage may result thereto due, for example, to moisture that may seep into the package or impurities trapped in the package when attaching the cover. Loss of light at the outside surface of the cover plate can be reduced by coating the outside surface of the plate with antireflecting layer in a known manner. The light reflection at the inside surface of the package and at the surface of the device is reduced in accordance with the prior art by filling the package between the device and the glass cover plate with a transparent substance such as grease having an index of refraction which causes the reflectivity at the two interfaces to be minimized. However, it is difficult if not impossible to apply such a grease without entrapment of air bubbles in the grease or at the surface of the optical device or at the bottom surface of the cover plate. The entrapments into the grease destroy the desired optical coupling and distort the path of light rays striking the device.

SUMMARY

In accordance with the invention, a liquid prepolymer substance which can be cured to become a transparent flexible polymer having an index of refraction very close to that of the cover plate is so applied to the top of the electro-optical device so that after curing the prepolymer liquid a trapezoidal mound of a resultant flexible polymer is built up over at least the light sensitive surface of the device. Then, an additional drop or two of the liquid is put on the top of the device and the cover plate is pressed down in contact with the prepolymer liquid and cemented in place, and the added liquid is cured to produce a good optical coupling between the bottom of the cover plate and the top of the mound and also between the bottom of the mound and the top of the device. If desired, the cured prepolymer liquid can cover all exposed surfaces of the ceramic chip carrying the optical device in which case the device is protected from any contamination such, for example, as moisture that may seep into the package between the cover plate and the mound, that is the device may be passivated. When the cover plate is glass, the prepolymer liquid may be a material sold by Dow Corning under the trade name "XR60–087" which is a liquid optically clear silicone gum of medium viscosity and which polymerizes to a flexible polymer mass when a catalyst such as XR60–087 curing agent is added and heat is applied.

DESCRIPTION

Figure 2:
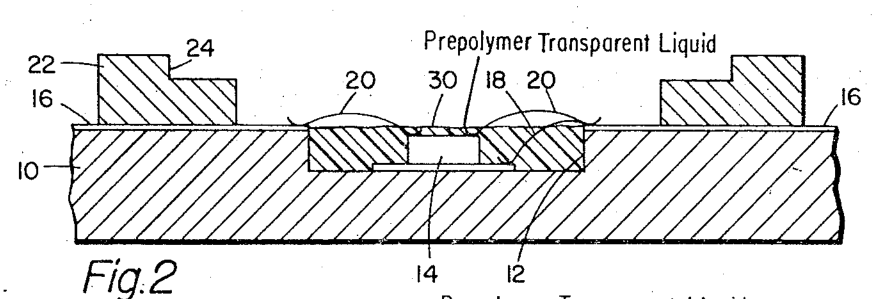
Figure 3:
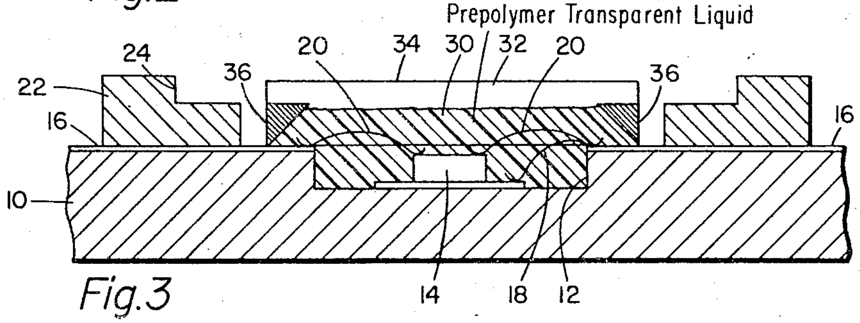
Figure 4:
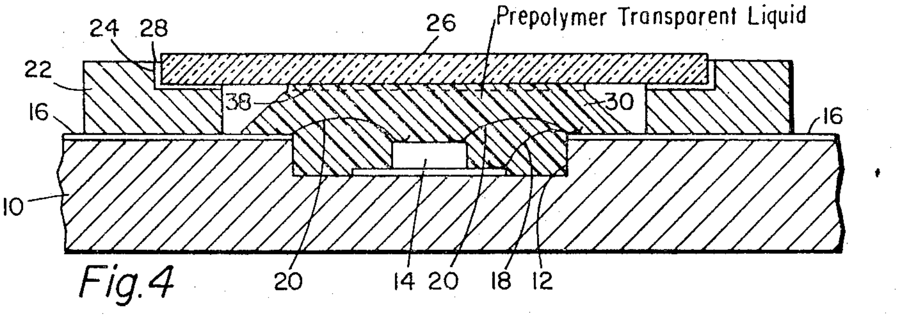

The invention will be better understood upon reading the following description in connection with the accompanying drawing in which:

FIG. 1 is a cross-sectional view of a packaged electro-optical device of the prior art which illustrates the problem solved by the present invention, and FIGS. 2, 3, and 4 illustrate steps in the process of this invention and the finished passivated and optical sensitivity enhanced electro-optical structure.

As shown in FIG. 1, a ceramic substrate 10 is provided having a hole 12 extending into one side, the upper side as viewed in FIG. 1, of the substrate 10. A photodetector device chip 14 is centrally located in the hole 12. Leads 16 may lie flat on the substrate 10, one of these leads 16 being connected to the bottom connection of the chip by a bonding wire 18 and other of the leads 16 being connected by bonding wires 20 to respective bonding pads on the device chip 14. A ceramic ring 22 is bonded to the substrate 10 surrounding the hole 12, the leads 16 extending between the ring 22 and the substrate 10. A notch 24 is provided to receive a cover plate 26. The cover plate 26 may be of glass. The bottom of the notch 24 supports the plate 26. The cover plate 26 is cemented in place as by epoxy cement 28 in the notch 24. In the described structure, light coming in through the transparent cover plate 26 and hitting the light sensitive portions of the device 14 is subject to reflection at the upper and lower surfaces of the cover plate 26 and at the upper surface of the device 14. Furthermore, the surface of the device 14 is exposed whereby it may be contaminated as by moisture which may seep in between the ring 22 and the substrate 10 or between the cover plate 26 and the ring 22. In accordance with the invention, a transparent mound of silicone flexible polymer mass is built up which has good coupling to the bottom of the cover plate and the optically sensitive part of the device 14 and has an index of refraction close to that of the cover plate 26 and to the top portion of the device 14. The flexible polymer mass also covers and protects the device 14 from any contamination.

In FIGS. 1 to 4, like reference characters have been applied to like parts. The first step of the method of preparing the package of FIG. 4 is to fill the hole 12 substantially full with a prepolymer liquid 30 which can be cured to a flexible polymer substance which is clear and transparent and which has an index of refraction close to that of glass. A clear transparent prepolymer liquid silicone gum of medium viscosity, sold by the Dow Corning Company under the trade name "XR60–087," is suitable for this purpose. By addition of a suitable catalyst to the prepolymer liquid 30 and by the use of heat, the prepolymer liquid 30 becomes a flexible polymer mass having the desired optical properties. Then, as shown in FIG. 3, a fixture 32 is positioned inside the ring 22 and on the leads 16. The fixture 32 comprises end walls 34, only one of which is shown, and sidewalls 36, 36. The sidewalls are in the form of right triangular prisms, and they are so attached to the end walls 34 that they each stand on a sharp vertex of the triangular prisms. The tops of the prisms 36, as viewed in FIG. 3, are at about or just below the bottom of the notch 24 which supports the cover plate. More liquid 30 is poured into the fixture 32 to a level just below the top of the prisms 36, 36 and cured, and then the fixture is removed. Now, the trapezoidal mound 36 (see FIG. 4) of flexible polymer substance reaches up to the dotted line 38 in FIG. 4. Then a drop or two of additional liquid is put on the top of the mound 36 and epoxy cement 28 is put in the notch 24 and the cover plate 26 is pressed down on the wetted mound 36 and in contact with the additional liquid and the additional drops of liquid are cured. If too much liquid has been added, the extra amount of liquid will flow down the sides of the mound 38. The second curing step will cause good optical coupling between the mound 38 and the device 14, and the third curing step will cause good optical coupling between the top of the mound 38 and the bottom of the plate 26 and, furthermore, there will be no optical boundaries in the mound itself.

If desired, another fixture comprising a plate having a hole therein may be used to make sure the additional drops of liquid are poured onto the top of the mound 38. Also, if desired, a fixture may be provided to help put the cover plate 26 in the notch 24 and to press it down.

Therefore, an optical device package having enhanced optical coupling to incident light and in which the optical device is passivated has been produced. If desired, the top of the cover plate 26 may be covered with an antireflective coating in any known manner.

We claim:

1. The method of producing an optical package including an optical device, and providing enhanced optical coupling to the device and passivation thereof, comprising the steps of:

pouring a liquid which can be cured to a clear transparent flexible polymer substance over said device, curing said liquid to a flexible polymer substance, applying an additional amount of liquid on the top of said flexible polymer substance, applying a transparent cover plate on said additional liquid, and curing said additional liquid.

2. The invention of claim 1 in which the liquid is poured into a fixture having at least one inner wall which slants upwardly and inwardly of the fixture and the liquid is cured in said fixture, whereby the flexible polymer takes a trapezoidal moundlike form.

3. The invention of claim 1 in which said device is positioned in a hole in a substrate, and including the preliminary step of at least partially filling said hole with curable liquid and curing the liquid in said hole.

4. The method of producing an optical package including an optical device providing an enhanced optical coupling to the device and passivation thereof, said device being positioned in a hole in a substrate, there being a support for a cover plate fixed to the substrate surrounding said hole, the steps of:

pouring a liquid which can be cured to a clear transparent flexible polymer substance into said hole to at least partially fill said hole, curing said liquid, placing a fixture on said substrate within said support and surrounding said hole, pouring said liquid into said fixture to a depth above said device and below the support height of said cover support for said cover plate, curing said liquid, removing said fixture, pouring an additional amount of said liquid on said second mentioned cured liquid, cementing a transparent cover plate in its support position on said support and in contact with said additional amount of liquid, and curing said additional liquid.

* * * * *